United States Patent [19]
Ishijima et al.

[11] Patent Number: 6,098,112
[45] Date of Patent: *Aug. 1, 2000

[54] STREAMS FUNCTION REGISTERING

[75] Inventors: Yoshihiro Ishijima, San Jose; Michael Krause, Boulder Creek, both of Calif.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/593,313

[22] Filed: Jan. 31, 1996

Related U.S. Application Data

[63] Continuation-in-part of application No. 08/545,561, Oct. 19, 1995, Pat. No. 5,815,707.

[51] Int. Cl.$^7$ .................................................. G06F 13/10
[52] U.S. Cl. .................................................. 709/301
[58] Field of Search ............................ 395/681; 709/301

[56] References Cited

U.S. PATENT DOCUMENTS

| | | | |
|---|---|---|---|
| 5,338,247 | 8/1994 | Goodwin et al. | 446/456 |
| 5,410,694 | 4/1995 | Uchida et al. | 707/1 |
| 5,519,833 | 5/1996 | Agranat et al. | 395/200.03 |
| 5,737,543 | 4/1998 | Gavin et al. | 395/285 |

OTHER PUBLICATIONS

Stroustrup, Bjarne, "The C++ Programming Language," second edition, Addison–Wesley, pp. 134–138, 1991.

Schneier, Bruce, "The Blowfish Encryption Algorithm" Dr. Dobb's Journal, see p. 1, Apr. 1994.

Hall, Charles, "Crash Helmet" Stacks, p. 2, lines 1 and 2, Sep. 1994.

Richi, A Stream Input–Output System, AT&T Laboritories Tech. Journal, vol. 63, No. 8, Oct. 1984, pp. 1897–1910.

Stevens, Advanced Programming In The UNIX® Environment, Addison–Wesley Pub. Co., Inc., 92, pp. 383–394 & 714.

Rago, UNIX® System V Network Programming, Addision–Wesley Pub. Co., Inc., 93, Ch. 3, pp. 95–147, Ch. 9, pp. 425–478, Ch. 10, pp. 479–537, Ch. 11, pp. 539–576.

*Primary Examiner*—Alvin E. Oberley
*Assistant Examiner*—St. John Courtenay, III
*Attorney, Agent, or Firm*—Jack A. Lenell

[57] ABSTRACT

An apparatus and method for kernel level modules or drivers identifying message processing functions and for controlling execution of the message processing functions at the stream head, so that the functions are available at the stream head for adapting stream data interpretation, stream execution behavior, and the like in accordance with various system requirements such as requirements of devices or user processes.

21 Claims, 2 Drawing Sheets

STREAMS FUNCTION REGISTERING

CROSS REFERENCE TO RELATED APPLICATION

This is a continuation in part of U.S. patent application Ser. No. 08/545,561 filed Oct. 19, 1995 entitled "Dynamic Function Replacement For STREAMS Framework", now U.S. Pat. No. 5,815,707.

FIELD OF THE INVENTION

The invention relates to data communications, and more particularly relates to a STREAMS framework for providing data communications between devices and a host computer, between different processes executing on the same computer, and between processes executing on different computers.

BACKGROUND OF THE INVENTION

STREAMS has become an industry de facto framework for implementing data communication network protocols, as well as various types of device drivers. STREAMS provides a bidirectional data path between a user level process, such as an application program, and a device driver in the kernel. A typical stream includes three main types of processing elements: a stream head, optional processing modules, and the device driver.

The device driver is found at the end, or tail of the stream. Drivers can be added to the kernel simply by linking their object files with the kernel object files. However, in the teachings of the prior art, the stream head is fixed since the stream head is provided with the kernel proper.

The stream head includes a set of routines that provide an interface between the user process level (known as "user space") and the rest of the stream, which executes only at the kernel process level (known as "kernel space"). Each stream head of the prior art is customizable to a only a small extent by selecting from among limited processing options it supports. In the prior art teachings, the stream head processing routines are used with every stream in the system.

Access to a stream is provided via an open system call having a STREAMS file descriptor. For example, when a user process makes the system call, the stream head routines are invoked, resulting in data copying, message generation, or control operations being performed. If a device driver is not already open, the open system call will build the stream. Once the stream is constructed and the open has completed successfully, another open of the same device creates a new file descriptor referring to the same stream.

The stream head is the only component in the stream that can copy data between the user process level and the kernel process level. All other components effect data transfer solely by communicating messages, and thus are isolated from direct interaction with any user process. Accordingly, the modules and drivers of the open stream execute within a context of the kernel process level and therefore lack context or knowledge of the user process level. This lack of context promotes a "one-size-fits-all" approach to process communication between user processes and kernel components. Such an approach limits modules and drivers from adapting stream data interpretation, stream execution behavior, and the like to satisfy changing requirements of whatever user process is currently executing upon the open device driver.

For example, modules and drivers in STREAMS of the prior art are particularly limited in adapting to support a transition from thirty two-bit applications running on a thirty two-bit kernel and processor architecture to sixty four-bit applications running on a sixty four-bit kernel and processor architecture. In order to protect an investment that computer users have in the thirty two-bit user applications as they migrate to the sixty four-bit kernel, STREAMS must be adapted to support both thirty two-bit user applications and sixty four-bit user applications running on the sixty four-bit kernel. Since the modules and drivers of an open stream execute within a context of the sixty four-bit kernel of the example, and therefore lack context or knowledge of the thirty two-bit application, the modules and drivers are limited in adapting stream data interpretation, stream execution behavior, and the like to satisfy requirements of the thirty two-bit application, which are different than requirements of the sixty four-bit application.

In general, whenever data is touched, application and kernel performance are degraded. Therefore, whenever data is touched at the stream head, a good guideline is to perform as many mutually exclusive operations in parallel at the stream head as possible, so as reduce requirements for touching the data again downstream. What is needed is an apparatus and method for kernel level stream processing modules or device drivers identifying message processing functions and for controlling execution of the identified functions at the stream head, so that the functions are available at the stream head to adapt stream data interpretation, stream execution behavior, and the like in accordance various system requirements such as requirements of devices or user processes.

SUMMARY OF THE INVENTION

The present invention provides an apparatus and method for kernel level stream processing modules or device drivers identifying message processing functions and for controlling execution of the identified functions at the stream head, so that the functions are available at the stream head for adapting stream data interpretation, stream execution behavior, and the like in accordance with various system requirements such as requirements of devices or user processes.

Briefly and in general terms the invention includes a stream head that is specially adapted to include a function controller for controlling execution of the message processing function identified by the device driver or stream processing module. Preferably the device driver or the stream processing module initially registers the function for processing messages of a stream at the stream head, for example when the device driver is opened to build the stream, or when the stream processing module is pushed onto the stream. Alternatively, the driver or module passes one or more parameters to the stream head to invoke the function on a per message basis.

A particularly advantageous aspect of the invention provides for a module or driver of a sixty four-bit kernel identifying a data format conversion function and for controlling execution of the function at the stream head to adapt stream data interpretation, stream execution behavior, and the like in accordance with requirements of a thirty two-bit user application. Similarly, the invention provides for a module or driver identifying a protocol conversion function and for controlling execution of the function at the stream head to convert a message protocol format in accordance with protocol format requirements of the user application.

Furthermore, by modules or drivers identifying functions and by controlling execution of the functions at the stream head in accordance with the invention, as many mutually exclusive operations as possible are performed by the functions in parallel at the stream head, so as reduce requirements for touching the data again downstream. For example, one of the most common tasks necessary for networking protocols is to calculate checksums for maintaining data integrity in transmitting a data packet. In contrast to a standard copying function of the prior art, which does not support checksum calculation, the teachings of the invention provide for identifying a kernel level module or driver specific function and for controlling execution of the function at the stream head, so that the function is available for moving data from user space to kernel space while simultaneously generating the necessary checksum.

Additionally, the invention advantageously provides for a module or driver identifying a function and for controlling execution at the stream head in response to dynamic changes in state of the module or driver within the kernel. For example, the invention provides for identifying a function to convert messages already enqueued on the stream head from normal priority messages into expedited messages, in response to priority state changes of the module or driver for new information received from a network connection.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

Figure 1:
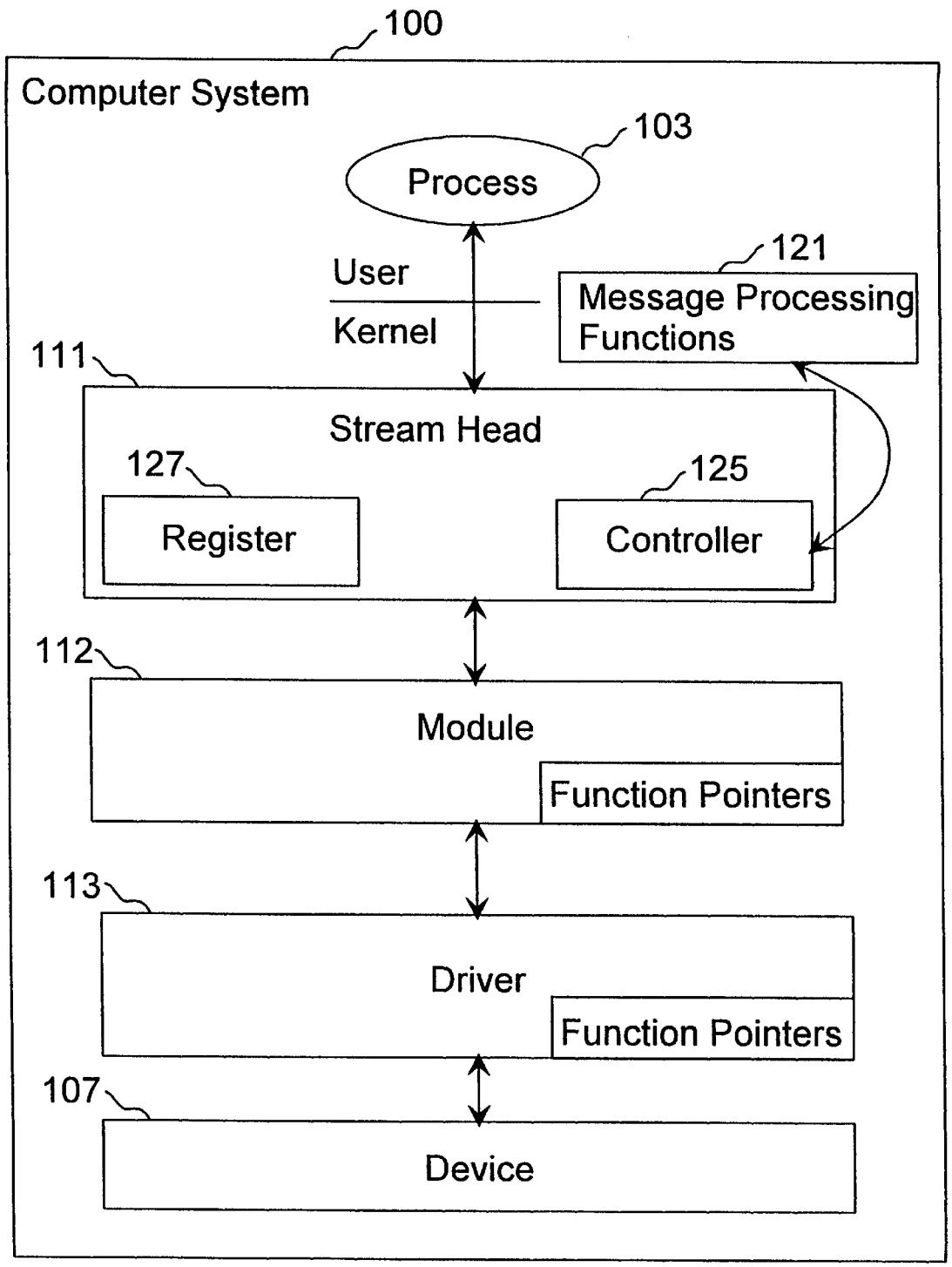
FIG. 1 is a simplified block diagram of a preferred embodiment of the invention.

A simplified block diagram of the invention is shown in FIG. 1. Within a computer system 100 preferably including one or more microprocessors controlled by suitable software, a stream provides bidirectional communication of messages between a user process 103 and a device 107, for example a hardware device or a pseudo device. Three of the main types of stream processing elements of the stream are a stream head 111, one or more optional processing modules 112, and a device driver 113, for example a hardware device driver or pseudo device driver. In the preferred embodiment, the invention provides extensions to the STREAMS framework to register message processing functions at the stream head. Helpful discussions and examples of the STREAMS framework are found in chapter 3 beginning on pg. 95, and chapters 9 through 11 beginning on page 425, of UNIX System V Network Programming by S. Rago, Addison Wesley professional computing series, (1993), which are incorporated herein by reference.

As shown in FIG. 1, the device driver coupled with the device for communicating messages with the device. The module and driver effect data transfer solely by communicating messages, and thus are isolated from direct interaction with any user process, such as a user application program. The stream head is coupled between the device driver and the user process for communicating messages with the user process. Within the STREAMS framework, the stream head is the only one of the three main types of processing elements that can copy data between a user process level and a kernel process level, which are illustrated by legends and a notional dividing line in FIG. 1.

As will be discussed in greater detail subsequently herein, the present invention advantageously provides for the kernel level module or driver identifying one or more message processing functions 121. Preferably each of the message processing functions is identified by at least one function pointers as shown in FIG. 1. The stream head includes a controller 125 for controlling execution of the identified message processing functions at the stream head.

In the preferred embodiment, when the device driver is opened to build the stream, or when the stream processing module is pushed onto the stream, the driver or module transmits the function pointer to the controller at the stream head, so as to register the message processing function at the stream head. Accordingly, in the preferred embodiment the stream head includes a register block 127, or register, for recording identity of the message processing function by recording the function pointer. Alternatively, the driver or module passes one or more parameters to the stream head to invoke the message processing function on a per message basis. Accordingly, the functions are made available at the stream head for adapting stream data interpretation, stream execution behavior, and the like in accordance with system requirements, such as requirements of the device 107 or user process 103.

Preferably the register block and controller of the stream head are embodied within the computer system using suitable software including a public data structure that records function pointers corresponding to the functions registered by the module or driver. The public data structure contains function pointers that correspond to the functions being registered by the module or driver. The function vector reflects the current function registration state. Accordingly, within the stream head instruction, <stream.h>, define the following public data structure:

```
struct sth_func_reg {
    int (*sth_copyin)();            /* Write-side copyin*/
    int sth_copyin_threshold;       /* argument passed to sth_copyin()*/
    int (*sth_32_to_64)();          /* Write-side 32-to-64 conversion
                                       function*/
    int (*sth_write_opt)();         /* Write-side optional function */
    int (*sth_read_opt)();          /* Read-side optional function */
    int (*sth_ioctl_opt)();         /* Ioctl optional function */
    int (*sth_64_to_32)();          /* Read-side 64-to-32 conversion
                                       function */
}
Within stream head declaration (private structure), define the following:
struct sth_s {
    ...
    struct sth_func_reg sth_f_reg;
    ...
}
```

Figure 2:
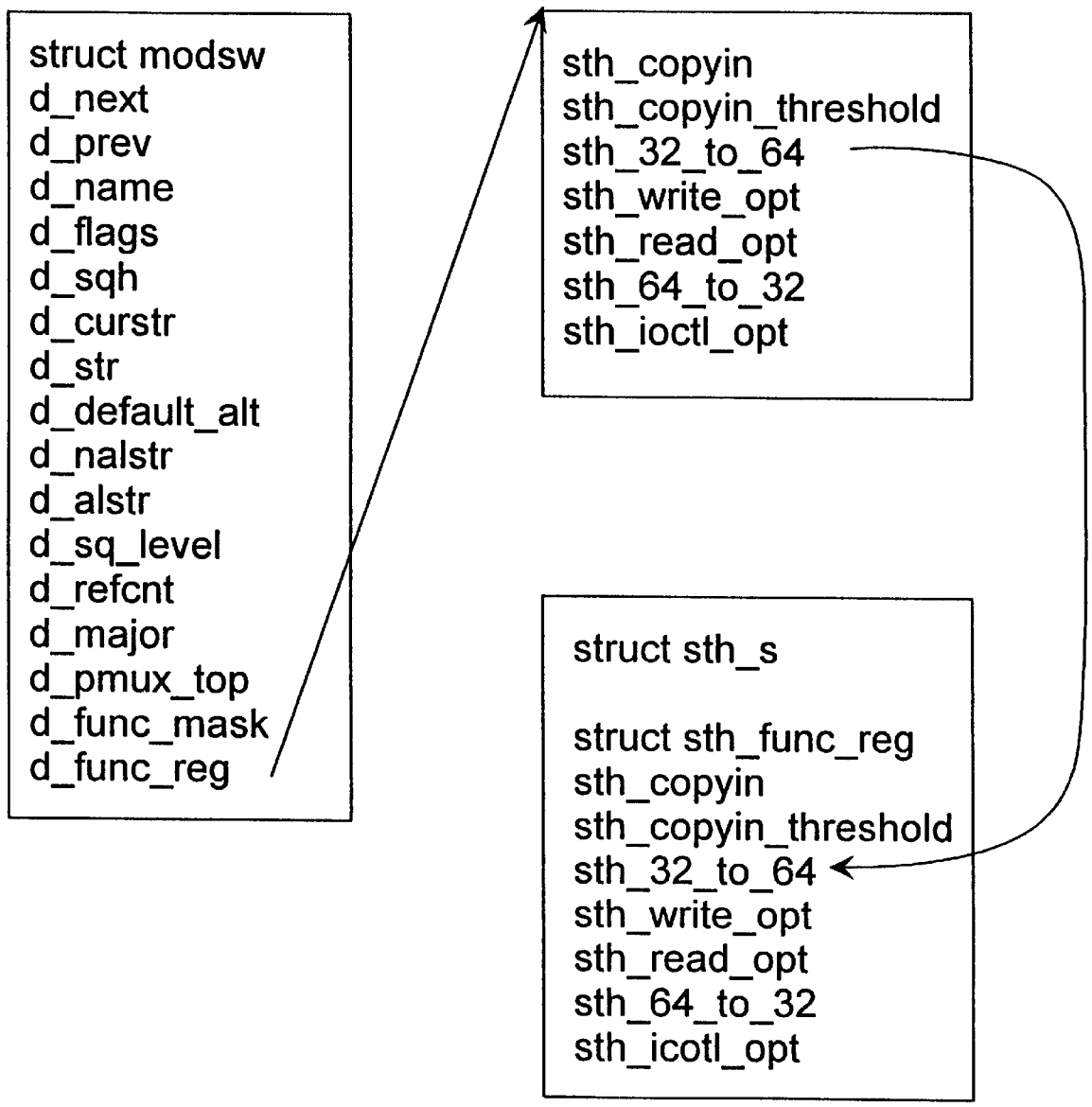
FIG. 2 is a simplified flow diagram illustrating operation of the preferred embodiment of the invention.

FIG. 2 is a simplified flow diagram illustrating operation of the preferred embodiment of the invention. In the preferred embodiment, streams modules or drivers register functions via str_func_install( ). str_func_install( ) may be called during module or driver installation, or at any time a module or driver decides to register functions. For example, driver A identifies 32-to-64 and 64-to-32 bit conversion functions for applications to use on the write and/or read paths. These functions will be registered when the driver is opened. This allows a single driver instance to simultaneously support thirty two and sixty four-bit applications. Similarly, if a push operation occurs, STREAMS will invoke the module's open routine and perform the stream head registration.

As shown, a module identifies the sth_32_to_64 function using a function pointer, which the module transmits to the controller of the stream head to be recorded. The module may disable the function by sending a message. For example, the module may disable the function by sending a message that results in a null evaluation of the record in the data structure, expressed as:

sth-<sth_func_reg.sth_32_to_64=NULL

If two STREAMS components have registered message processing functions which conflict, e.g. two sth_read_opt( ) functions, the stream head structure will reflect the highest component's function within the stack; if there is no conflict, the stream head will reflect both component's functionality. A preferred calling sequence is as follows:

str_func_install(struct sth_func_reg*func_reg, int func_mask);

func_mask is a bit mask composed of any of the following:

```
/* Flags for func_mask */
#define FUNC_REG_COPYIN_ENABLE      0X0001
#define FUNC_REG_COPYIN_DISABLE     0X0002
#define FUNC_REG_32_TO_64_ENABLE    0X0004
#define FUNC_REG_32_TO_64_DISABLE   0X0008
#define FUNC_REG_WRITE_OPT_ENABLE   0X0010
#define FUNC_REG_WRITE_OPT_DISABLE  0X0020
#define FUNC_REG_READ_OPT_ENABLE    0X0040
#define FUNC_REG_READ_OPT_DISABLE   0X0080
#define FUNC_REG_64_TO_32_ENABLE    0X0100
#define FUNC_REG_64_TO_32_DISABLE   0X0200
#define FUNC_REG_IOCTL_OPT_ENABLE   0x0400
#define FUNC_REG_IOCTL_OPT_DISABLE  0x0800
```

This calling sequence specifies which functions are automatically registered at open time or push time. func_req and func_mask are stored in its module switch table entry:

```
struct modsw {
    struct modsw *        d_next;
    struct modsw *        d_prev;
    char                  d_namee[FMNAMESZ+1];
    char                  d_flags;
    SQHP                  d_sqh;
    int                   d_curstr;
    struct streamtab *    d_str;
    struct streamtab *    d_default_alt;
    int                   d_naltstr;
    struct streamtab **   d_altstr;
    int                   d_sq_level;
    int                   d_refcnt;
    int                   d_major;
    struct sth_s *        d_pmux_top;
    int                   d_func_mask
    struct sth_func_reg * d_func_reg;
};
```

A module or driver will activate or de-activate a registered message processing function by informing the stream head via a M_SETOPTS message. This is done by extending the stroptions data structure which is defined within <stream.h>.

```
struct stroptions {
    ulong so_flags;         /* options to set*/
    short so_readopt;       /* read option*/
    ushort so_wroff;        /* write offset*/
    long so_minpsz;         /* minimum read packet size*/
    long so_maxpsz;         /* maximum read packet size*/
```

-continued

```
    ulong so_hiwat;         /* read queue high-water mark*/
    ulong so_Iowat;         /* read queue low-water mark*/
    unsigned char so_band;  /* band for water marks*/
};
```

By extending this data structure to the following, we maintain the original layout so that modules or drivers which do not support function registration will continue to work as before:

```
struct stroptions {
    ulong         so_flags;       /* options to set*/
    short         so_readopt;     /* read option*/
    ushort        so_wroft;       /* write offset*/
    long          so_minpsz;      /* minimum read packet size*/
    long          so_maxpsz;      /* maximum read packet size*/
    ulong         so_hiwat;       /* read queue high-water mark*/
    ulong         so_Iowat;       /* read queue low-water mark*/
    unsigned char so_band;        /* band for water marks*/
    short         so_device_id;   /* driver or module identifier*/
    short         so_func_mask;   /* mask of enabled functions*/
}
``` so_device_id is the device identifier that is returned when the driver or module is installed within the system. For the preferred embodiment, this occurs via str_install( ). str_install( ) will generate a unique so_device_id which the driver or module records in a global variable which can be utilized whenever it wishes to perform function registration. so_func_mask specifies which function(s) is to be activated or de-activated. If a bit is not defined, the corresponding registered message processing function will remain in effect.

A module or driver has the capability of sending a specially adapted M_SETOPTS message up at any time they choose in order to modify stream head characteristics. When this structure is decoded, the stream head code will examine the so_func_mask and record or nullify the corresponding stream head function address based on the flags set. If any functions are enabled or remain enabled, the stream head will set a flag to indicate function registration should be checked for during stream head message processing.

For using the invention in conjunction with the system calls, the following discussions apply. Upon the write( ) system call, the following code will be added to the STREAMS implementation. The registered write function preferably includes a protocol dependent checksum off-load function which would combine the data movement from user-to-kernel space with an automatic checksum calculation. Using this technique, the invention continues to remain protocol independent while still adding value to the STREAMS framework.

Preferably, such a combined copyin/checksum function should reference a threshold variable in order to improve performance. This threshold variable is stored as part of the original data structure and will be passed into the function. The function would then examine the uiop length fields and compare them with the threshold variable and determine if it is appropriate to perform the registered copyin function.

The circumstances for not doing so are protocol dependent but an example case would be if the underlying protocol were only allowed to send small packets such as 512 bytes in length and the application were sending down data in 8 Kilo-Byte units. In such a case, better performance would be seen using the standard copyin and checksum processing instead of invoking 16 registered copyin/checksum function calls and the rest of the associated overhead. To determine the appropriate formula for when to invoke and such will require some experimentation with each protocol, but this is independent of the STREAMS framework and the proposed implementation. The following exemplary instruction code provides for operation of the invention in conjunction with the write( ) system call:

```
/* If functions have been registered, then controller executes proper
functions*/
if (sth->sth_flags & F_STH_FUNC_REG_ENABLED) {
  if (sth->sth_f_reg.sth_copyin) {
    error = (*sth->sth_f_reg.sth_copyin)(mp, w_cnt, uiop,
        sth->sth_copyin_threshold);
    /*If EAGAIN, then copyin did not occur, so perform task normally*/
    if (error == EAGAIN)
    UIOMOVE_WRITE(mp, cnt, uiop, error);
    if (error)
    goto error_processing_code;
  }else {
    UIOMOVE_WRITE(mp, cnt, uiop, error);
  }
  /* controller executes 32 to 64 bit conversion jf defined and the caller is a
   * 32-bit application. This is performed on the mblk.
   */
  if (sth->sth_f_reg.sth_32_to_64 && uarea->32bit_hint)
  error = (*sth->sth_f_reg.sth_32_to 64)(mp);
  /* If the driver/module wants some other form of optional processing
   * performed on outbound data, then execute this upon the mblk.
   */
  if (sth->sth_f_reg.sth_write_opt)
  error = (*sth->sth_f_reg.sth_write_opt)(mp);
  }else{
  /* The function is not defined so perform the original code*/
  }
```

The rest of the write path code would be implemented normally.

For putmsg( )/putpmsg( ), the STREAMS framework is extended as follows:

putmsgo and putpmsg( ) allow the caller to specify control data which will be passed in a M_PROTO or M_PCPROTO message to the lower module or driver. This data may require conversion or post-processing once it is brought into the kernel. Examples of this would be a thirty two- bit application which was compiled using a thirty two-bit version of the TPI (Transport Provider Interface). This interface defines structures including data elements that are correctly interpreted by the invention as either thirty two-bit or sixty four-bit. These data elements would need to be converted into sixty four-bit data elements in order for a sixty four-bit system to provide the correct data interpretation. In addition, control data may require some other form of conversion once it has been brought into the kernel (keep in mind that normal data if brought in via a alternative copyin path may not be altered just like on the write( ) path). An example of suitable instruction code is as follows:

```
/* The control portion if being processed, is copied into the kernel first.
 * We simply perform the normal copyin activity and then
    perform the post-
 * processing as follows.
 */
if (error = COPYIN(user_ptr, mp, cnt, ctl)) {
  /* Perform error recovery*/
}
if (sth->sth_flags & F_STH_FUNC_REG_ENABLED) {
  if (sth->sth_f_reg.sth_copyin){
```

```
    error = (*sth->sth_f_reg sth_copyin)(mp, w_cnt, uiop,
        sth->sth_copyin threshold);
    /* If EAGAIN, then copyin did not occur, so perform task normally*/
    if (error == EAGAIN)
      error = COPYIN(user_ptr, mp, cnt, ctl);
    if (error)
      goto error_processing_code;
}else{
    COPYIN(user_ptr, mp, cnt, ctl);
}
    /* Perform 32 to 64 bit conversion if defined and the caller is a
     * 32-bit application.
     */
if (sth->sth_f_reg.sth_32_to_64 && uarea->32bit_hint)
  error = (*sth->sth_f_reg.sth_32_to 64)(mp);
/* If the driver/module wants some other form of optional processing
 * performed on outbound data, then execute this upon the control mblk.
 */
  if (sth->sth_f_reg.sth_write_opt)
    error = (*sth->sth_f_reg.sth_write_opt)(mp);
}else{
  /* The function is not defined so perform the original code */
```

For the read( ) system call, the code would be similar in nature but its functionality would be replaced with the module/driver's required modified functionality. The present invention provides for a module or driver of a sixty four-bit kernel registering a function for adapting stream data interpretation, stream execution behavior, and the like in accordance with requirements of a thirty two-bit user process. In particular, the function examines the thread of the user process to determine whether the user processes requires a thirty two-bit format or a sixty four-bit format. If the user process requires a thirty two-bit format, the function converts the data format of the messages between a thirty two bit data format required by the user process and a sixty four bit data format required by the device driver. Similarly, if the application does not speak a currently employed version of a protocol that is initially accepted the connection, for example Internet Protocol (IP) version 6 instead of Internet Protocol (IP) version 4, then the data is converted to the correct protocol format at this time. The following code provides an example:

```
/* If functions have been registered, then controller executes proper
functions*/ if (sth->sth_flags & F_STH_FUNC_REG_ENABLED) {
  /* If the driver/module wants some other form of optional processing
   * performed on outbound data then execute this upon the mblk. This
   * could be where the conversion from IPv4 to/from IPv6 is performed.
   */
  if (sth->sth_f_reg.sth_read_opt)
    error = (*sth->sth_f_reg.sth_read_opt)(mp);
  /* If the calling application is a 32-bit application and there is a
   * conversion function registered then invoke it before moving the
   * data to user space.
   /*
  if (sth->sth_f_reg.sth_64_to_32 && uarea->32 bit_hint)
    error = (*sth->sth_f_reg.sth_64_to_32)(mp);
}
/* Move the data using the current implementation for moving code */
UIOMOVE_READ(mp, cnt, uiop, error);
```

Using the invention in conjunction with getmsg( ) and getpmsg( ) system calls is similar to using the invention with read( ) system calls as discussed previously herein, additional code is included to handle the control data portion of the message. Example code is as follows:

```
/* If functions have been registered, then controller executes proper
functions*/ if (sth->sth_flags & F_STH_FUNC_REG_ENABLED) {
    /* If the driver/module wants some other form of optional processing
     * performed on outbound data, then execute this upon the mblk. This
     * could be where the conversion from IPv4 tolfrom IPv6 is performed.
     */
    if (sth->sth_f_reg.sth_read_opt)
        error = (*sth->sth_f_reg.sth_read_opt)(mp);
    /*Next we apply the 32-bit conversion function to the
      M_DATA portion
     * of the message if it exists and a function has been registered.
     */
    if (sth->sth_f_reg.sth_64_to_32 && uarea->32bit_hint)
        error = (*sth->sth_f_reg.sth_64_to_32)(mp);
}
error = COPYOUT(mp, user_ptr, cnt, ctl);
```

Once the function registered processing has been completed, then move the data to the user-space using the normal execution path.

For the ioctl path, depending upon whether data is being moved into or out of the kernel, similar steps are taken. The implementation assumes the optional ioctl function performs the data movement or could restrict it to simply a pre- or post-processing role as illustrated in the previous system calls. It should be understood that ioctis may communicate with different modules or drivers. Accordingly, if this optional structure is utilized, then the modules and drivers are constructed so as to have some understanding of how these messages should be interpreted—normally with the highest module/driver being the final arbiter. While this ioctl path is defined for completeness sake, it is recommended that ioctls use the per message facility instead, since this allows each module or driver processing an ioctl to target the particular message. Example code is as follows.

```
if (sth->sth_flags & F_STH_FUNC_REG_ENABLED &&
    sth->sth_f_reg.sth_ioctl_opt)
    error = (*sth->sth_f_reg.sth_ioctl_opt)(mp, direction_hint);
```

Additionally, the invention provides for a module or driver identifying a function and for controlling execution at the stream head in response to dynamic changes in state of the module or driver within the kernel. For example, the invention provides for identifying a function to convert messages already enqueued on the stream head from normal priority messages into expedited messages, in response to priority state changes of the module or driver for new information received from a network connection. This elimates any need to modify the user application or an interface library to provide the desired functionality.

In an alternative embodiment of the invention, the STREAMS framework is extended is to support the ability of a module or driver to perform function registration on a per message basis on the inbound path, i.e. read, getmsg, getpmsg, ioctl for M_COPYOUT. This functionality is provided because a module or driver may not always require a set of functions to be invoked on every message sent upstream, but only one packet in a number, N. This functionality is added for flexibility purposes; the underlying concept of what such a function would provide is still the same. Such functions would be invoked to convert data based on the application involved. The most common use, and for which we will always pass in a hint as a parameter is for sixty four bit to thirty two bit conversion. First, the message structure used to describe the user data is suitably modified. This data structure is defined within <stream.h>

```
struct msgb{
    struct msgb*    b_next;     /* next message on queue*/
    struct msgb*    b_prev;     /* previous message on queue*/
    struct msgb*    b_cont;     /* next message block of message*/
    unsigned char*  b_rptr;     /* first unread data byte in buffer*/
    unsigned char*  b_wptr      /* first unwritten data byte*/
    struct datab*   b_datap;    /* data block*/
    unsigned char   b_band;     /* message priority*/
    unsigned char   b_pad1;
    unsigned short  b_flag;     /* message flags*/
    (int32*)        b_func      /* function to be invoked*/
    MSG_KERNEL_FIELDS
};
```

Additionally, a new flag within the msgb->b_flag field is defined. This new flag is used to indicate that the function which is stored within the msgb structure should be invoked upon the user data when it is being moved from the kernel to user space via an application system call:

```
#define MSGFUNCREG 0x2000 /*Execute the embedded func-
    tion on the data */
```

An alternative implementation would be to set the b_flag field but with a flag which indicates which registered message processing function to invoke. This would also require the driver/module to include a device_id value within a new msgb field b_device_id.

```
#define MSGREADOPT      0x6000
#define MSGIOCTLOPT     0xa000
#define MSG64TO32       0xb000
```

The previously described code is modified as follows:
    On the read, getmsg, getpmsg, and ioctl paths, the code would contain the following two lines which would be executed by the controller:

```
/* Check it per message processing has been enabled*/
if (mp->b_flag & MSGFUNCREG)
    error = (*mp->b_func)(mp, uarea->32bithint);
/* If functions have been registered, then execute proper functions*/
if (sth->sth_flags & F_STH_FUNC_REG_ENABLED){
    . . .
}
An alternative implementation would be:
/* Check if per message processing has been enabled*/
if (mp->b_flag & MSGFUNCREG) {
    error = (*(find_func(b_device_id b_flag)))(mp, uarea->32bithint);
/* If functions have been registered, then execute proper functions*/
if (sth->sth_flags & F_STH_FUNC_REG_ENABLED) {
```

Various structures and codings for these register functions may be used with beneficial results. An example of a simple structure is as follows:

```
int32
drv_a_32_to_64(MBLKP mp)
{
```

-continued

```
/* Check the message type to determine the conversion code to execute.
 * For each message type there would be a set of conversion code.
 * Optimalty, each driver or module should create an ABI (Application
 * Binary Interface) for communicating information
   between the application
 * and itself. By doing so, the conversion can be done on a per message
 * basis without creating cumbersome code to understand all
 * message types. This conversion code would be re-used
 * to reverse the conversion on the inbound 64_to_32
 * path if the calling application instance is a 32-bit
 * compiled application.
 *
 * For other types of optional manipulation or copyin/checksum, there
 * might be similar code since the movement/manipulation of the
 * data may be on a per message type need. For example, we usually
 * do not need a copyin/checksum for an ioctl path (though we
 * could use one); instead we may want a copyin/modification
 * utility that performs some automatic
 * conversion of the data during movement from user-to-kernel
 * or kernel-to-user without having to perform the
 * given optional execution paths.
 */
  switch(mp->b_datap->db_type) {
  case M_DATA:
    /* Perform conversion based on a pre-defined driver ABI*/
    break;
  case M_PROTO:
    /* Perform conversion based on a pre-defined driver ABI*/
    break;
  case M_PCPROTO:
    /* Perform conversion based on a pre-defined driver ABI*/
    break;
  case M_IOCTL:
    /* Perform conversion based on a pre-defined driver ABI*/
    break;
  case M_COPYIN:
    /* Perform conversion based on a pre-defined driver ABI*/
    break;
  case M_COPYOUT:
    /* Perform conversion based on a pre-defined driver ABI*/
    break;
  default:
    /* do nothing*/
  }
}
```

As discussed, the invention provides an apparatus and method for kernel level modules or drivers identifying message processing functions and for controlling execution of the message processing functions at the stream head. Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

What is claimed is:

1. An apparatus implemented in a computer system that provides a data path for communicating messages between a device and a user process, the apparatus comprising:
    a data interpretation function for providing an alternative data representation of the messages;
    wherein the data interpretation function is adapted to perform, in and of itself, data interpretation operations on the messages, so as to provide the alternative data representation of the messages;
    wherein the data interpretation function itself actually performs such data interpretation operations, independent of any I/O redirection device driver;
    a device driver coupled with the device for communicating messages with the device, the device driver being adapted to identify the data interpretation function; and
    a stream head coupled between the device driver and the user process for communicating messages with the user process, the stream head being adapted to include a data interpretation function controller for controlling execution at the stream head of the data interpretation function identified by the device driver.

2. An apparatus as in claim 1 wherein:
    the device driver is adapted to provide a function pointer for identifying the data interpretation function;
    the device driver is further adapted for transmitting the function pointer to the data interpretation function controller of the stream head; and
    the function controller of the stream head is adapted for receiving the function pointer for controlling execution of the data interpretation function at the stream head.

3. An apparatus as in claim 1 wherein the stream head further includes a register for recording identity of the data interpretation function for controlling its execution at the stream head.

4. An apparatus as in claim 1 wherein the data interpretation function includes a function for converting data format of the messages.

5. An apparatus as in claim 1 wherein the data interpretation function includes a function for examining a thread of the user process so as to determine a required data format of messages generated by the user process.

6. An apparatus as in claim 1 wherein the data interpretation function includes a function for converting the data format of the messages between a thirty two bit data format required by the user process and a sixty four bit data format required by the device driver.

7. An apparatus as in claim 1 wherein the data interpretation function includes a function for converting a protocol format of the messages.

8. An apparatus as in claim 1 wherein the data interpretation function includes a function for generating a checksum for each of the messages.

9. An apparatus as in claim 1 wherein:
    the stream head includes a queue for enqueueing the messages; and
    the data interpretation function includes a function for responding to dynamic changes in state of the device driver by modifying messages enqueued on the queue of the stream head.

10. An apparatus as in claim 1 wherein:
    the stream head includes a queue for enqueueing the messages; and
    the data interpretation function includes a function for responding to dynamic changes in priority state of the device driver by modifying priority of the messages enqueued on the queue of the stream head.

11. An apparatus implemented in a computer system comprising:
    a data interpretation function for providing an alternative data representation of the messages;
    a stream processing module adapted to identify the data interpretation function;
    a stream head coupled between the stream processing module and a user process for communicating messages with the user process, the stream head being adapted to include a data interpretation function controller for controlling execution of the data interpretation function identified by the stream processing module.

12. A method for communicating messages between a device and a user process within a computer system, comprising the steps of:

communicating the messages between the device and a device driver;

communicating the messages between the device driver and the stream head;

identifying a data interpretation function;

registering the data interpretation function at the stream head so as to control execution of the function at the stream head;

altering data representation of the messages by executing the data interpretation function;

controlling execution of the data interpretation function at the stream head; and communicating the messages between the stream head and the user process.

13. A method as in claim 12 wherein the step of identifying the data interpretation function includes using the device driver to identify the data interpretation function.

14. A method as in claim 12 wherein:

the step of communicating the messages between the device driver and the stream head includes communicating the messages between the device driver and the stream head through a processing module; and the step of identifying the data interpretation function includes using the processing module to identify the data interpretation function.

15. A method as in claim 12 wherein the step of altering data representation of the messages includes converting data format of the messages.

16. A method as in claim 12 wherein the step of altering data representation of the messages includes examining a thread of the user process so as to determine a required data format of messages generated by the user process.

17. A method as in claim 12 wherein the step of altering data representation of the messages includes converting the data format of the messages between a thirty two bit data format required by the user process and a sixty four bit data format required by the device driver.

18. A method as in claim 12 wherein the step of altering data representation of the messages includes converting a protocol format of the messages.

19. A method as in claim 12 wherein the step of altering data representation of the messages includes generating a checksum for each of the messages.

20. A method as in claim 12 wherein:

the method includes enqueueing the messages at the stream head; and the step of altering data representation of the messages includes responding to dynamic changes in state of the device driver by modifying messages enqueued on the queue of the stream head.

21. An article of manufacture comprising:

a program storage medium having computer readable program code embodied therein for causing communication of messages between a device and a user process within a computer system, the computer readable program code in said article of manufacture including:
computer readable program code for causing the computer system to communicate the messages between the device and a device driver;

computer readable program code for creating an alternative data representation of the messages using a data interpretation function;

computer readable program code for causing the computer system to identify the data interpretation function;

computer readable program code for causing the computer system to register the data interpretation function at the stream head for controlling execution of the function at the stream head;

computer readable program code for causing the computer system to control execution of the data interpretation function at the stream head so as to process the messages; and computer readable program code for causing the computer system to communicate the messages between the stream head and the user process.

* * * * *